(12) United States Patent
Honda (10) Patent No.: US 7,154,686 B2
(45) Date of Patent: Dec. 26, 2006

(54) METHOD OF REDUCING ERROR RATE OF MAGNETIC RECORDING MEDIUM

(75) Inventor: Hidetoshi Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 10/819,803

(22) Filed: Apr. 7, 2004

(65) Prior Publication Data

US 2004/0207942 A1    Oct. 21, 2004

(30) Foreign Application Priority Data

Apr. 16, 2003    (JP) ............... P2003-111375

(51) Int. Cl.
*G11B 27/36* (2006.01)
(52) U.S. Cl. ...................................... 360/31
(58) Field of Classification Search ............. None
See application file for complete search history.

(56) References Cited

U.S. PATENT DOCUMENTS

| 5,453,886 | A | * | 9/1995 | Kobayashi et al. ........... 360/46 |
| 5,645,917 | A | * | 7/1997 | Ejiri et al. ............... 428/840.1 |
| 6,780,531 | B1 | * | 8/2004 | Tani et al. ............... 428/840.3 |
| 6,781,779 | B1 | * | 8/2004 | Arita et al. .................... 360/59 |

* cited by examiner

*Primary Examiner*—Wayne Young
*Assistant Examiner*—Glenda P. Rodriguez
(74) *Attorney, Agent, or Firm*—Robert J. Depke; Rockey, Depke, Lyons & Kitzinger LLC

(57) ABSTRACT

In a magnetic recording system applied to a magnetic recording medium having a magnetic layer composed of a metal magnetic thin film, the error rate of the magnetic recording medium can be reduced by selecting an isolated reproducing waveform half-width less than the shortest recording wavelength to be used.

4 Claims, 7 Drawing Sheets

MAGNETIC LAYER 150nm

HALF-WIDTH (×10nm) vs FILM THICKNESS OF PROTECTIVE LAYER (nm)

FIG. 4

RELATIONSHIP BETWEEN HALF WIDTH AND ERROR RATE (SHORTEST RECORDING WAVELENGTH 0.5 μm) NG

ERROR RATE vs HALF-WIDTH (nm)

FIG. 5

RELATIONSHIP BETWEEN CNR AND ERROR RATE

METHOD OF REDUCING ERROR RATE OF MAGNETIC RECORDING MEDIUM

CROSS REFERENCE TO RELATED APPLICATIONS

The present document is based on Japanese Priority Document JP2003-111375, filed in the Japanese Patent Office on Apr. 16, 2003, the entire contents of which being incorporated herein by reference.

BACKGROUND OF THE INVENTION

1. Field of the Invention

The present invention relates to a method of reducing the error rate of a magnetic recording medium having a non-magnetic support member on which a magnetic layer composed of a metal magnetic thin film is formed.

2. Description of Related Art

Conventionally, in order to achieve a high image quality in the field of video tape recorders (VTRs) and the like, there has been the widening demands for high density recording of magnetic recording media. Therefore it is important to perform a further shorter wavelength recording.

On the other hand, digital magnetic recording systems are aiming at a higher density recording, and a magnetoresistance effect type magnetic head (an MR head) of high sensitivity and a giant magnetoresistance effect type magnetic head (a GMR head) have been applied. However, in order to reduce error rate, it becomes necessary to realize a high output and a high CNR, while reducing dropout (D.O.) that is a signal regeneration defect.

It is also important to have a waveform distortion in accordance with the characteristic of a magnetic system, in order to reduce error rate. Usually, the system determines the optimum value of reading timing in accordance with the characteristic of a magnetic recording medium. For example, a magnetic recording medium, a magnetic layer of which is formed by oblique evaporation of Co, has an easy axis of magnetization located at about 30° with respect to the direction of a plane of the magnetic layer. Therefore the reading timing is usually determined in accordance with the occurrence of a 55 to 60% waveform distortion.

In view of the above, proposals have been made to specify a half-width on the basis of magnetic property (see, for example, Japanese Patent Application Publication No. 2002-92853), which merely presuppose dependence on a magnetic recording system. No consideration has been given to the fact that the essence of half-width is a matter to be determined when used in a magnetic recording system.

Hence, the conventional designs of magnetic recording media have been required to reduce D.O. and control wavelength distortion to a proper value, while achieving a high CN ratio. Even if a low D.O. and a high CN ratio are achieved, it is not yet enough to reduce the error rate of a magnetic recording medium having a tendency toward a further higher performance.

While in the recent years, as the need for still higher image quality has been increased, the electromagnetic characteristic of magnetic recording media has been improved. There is a proposal of a digital VTR system using a narrow tape having a width of 8 mm or less, for example.

Also in recording media for computer, a tape of ½ inch or less has been proposed to perform recording/reproducing at a higher density.

However, such a narrow tape is also required to have a high electromagnetic characteristic to ensure a sufficient recording density. In the present circumstances, only thin-film type magnetic recording media such as evaporation tapes can comply with this need. Further, in order to comply with a higher density recording, it seems to be essential to use a magnetic recording medium suited for an MR head and a GMR head that have a higher sensitivity and a high output.

Heretofore, it was considered that a medium having a low error rate is achievable by sufficiently suppressing D.O., achieving a high output and a high CN ratio, and controlling wavelength distortion to a desired range. However, it is important to further reduce error rate of a medium in order to achieve a further higher density.

SUMMARY OF THE INVENTION

In view of the conventional drawbacks, the present invention seeks to provide a method of reducing the error rate of a magnetic recording medium, with which it is capable of sufficiently reducing error rate by controlling heretofore considered predetermined parameters of a digital recording system.

According to one aspect of the present invention, in order to reduce the error rate of a magnetic recording medium provided with a non-magnetic support member having on a main surface thereof a magnetic layer composed of a metal magnetic thin film, an isolated reproducing waveform half-width is selected less than a shortest recording wavelength to be used, in a magnetic recording system to be applied.

With this method, a further reduction of error rate can be achieved by selecting an isolated reproducing waveform half-width less than a shortest recording wavelength, in addition to the manners of reducing D.O., achieving a high output and a high CN ratio, and controlling waveform distortion to a desired range, which have conventionally been performed.

BRIEF DESCRIPTION OF THE DRAWINGS

The above and other objects, features and advantages of the present invention will become more apparent from the following description of the presently preferred exemplary embodiments of the present invention taken in conjunction with the accompanying drawings, in which.

DETAIL DESCRIPTION OF THE PREFERRED EMBODIMENTS

A magnetic recording medium applied to a method of the present invention will be described in the accompanying drawing. The following example is illustrative and should not be viewed as limiting the present invention.

Figure 1:
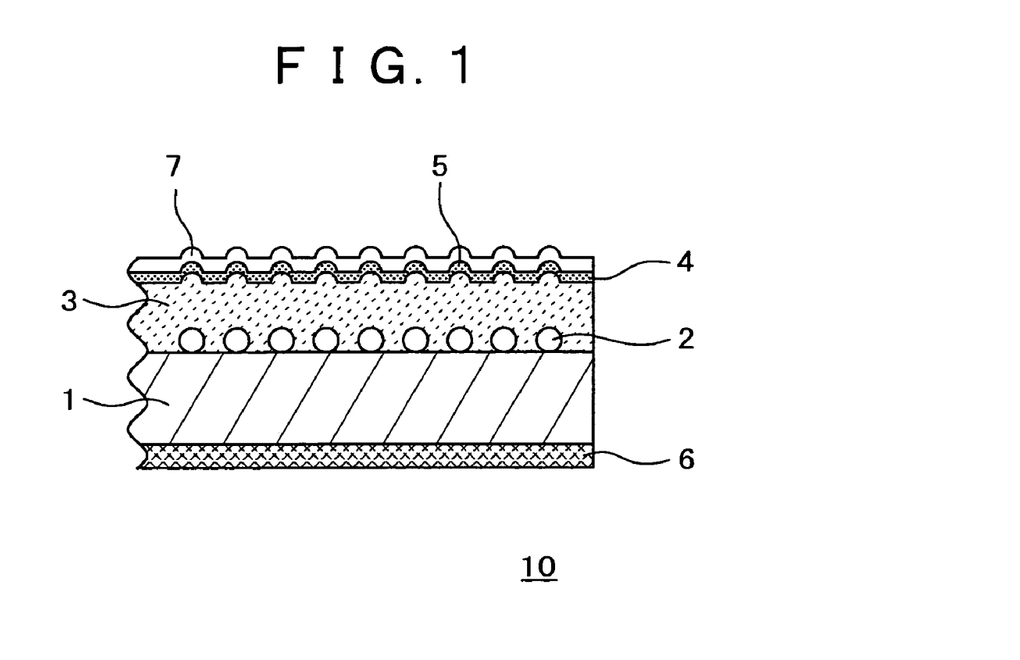
FIG. 1 is a schematic block diagram showing one example of magnetic recording media applied to a method of the present invention.

Referring to FIG. 1, a magnetic recording medium 10 includes a non-magnetic support member 1 having on a main surface thereof particles 2, and a magnetic layer 3 and a protective layer 4 and a top coat layer 7 are laminated thereon. By the particles 2, micro projections 5 are formed on the uppermost surface on the side of the magnetic layer 3. A back coat layer 6 is formed on another main surface of the non-magnetic support member 1.

As the non-magnetic support member 1, any of the known support members for magnetic tapes is applicable. For example, there may be cited polyesters such as polyethylene terephthalate, polyethylene naphthalate, etc.; poyolefins such as polyethylene, polypropylene, etc.; cellulose derivatives such as cellulose triacetate, cellulose diacetate, cellulose acetate butylate, etc.; vinyl resins such as polyvinyl chloride, polyvinylidene chloride, etc.; plastics such as polycarbonate, polyimide, polyamide, polyamideimide, etc.; paper; metals such as aluminum, copper, etc.; light alloys such as aluminum alloy, titanium alloy, etc.; ceramics; and single crystal silicon.

As the particles 2 disposed on the surface of the non-magnetic support member 1, particles such as $SiO_2$, $TiO_2$, $Al_2O_3$, and $CaCO_3$; emulsion and the like are usable. Emulsion may be aqueous or nonaqueous emulsion. Latex is also usable. As a synthetic resin contained in emulsion, there may be cited, merely by way of example and without limitation, thermoplastic resins composed of homopolymer or copolymer such as vinylacetate, acrylate, methacrylate, vinylidene chloride, vinyl chloride, ethylene, styrene, etc.; thermosetting resins such as epoxy resin, etc.; and synthetic rubbers such as butadiene-styrene copolymer, butadiene-acrylonitrile copolymer, etc. The particles 2 having a predetermined particle diameter are used to control the height of the micro projections 5. As a material for forming the particles 2, any material, which can control the height of the micro projections 5 to a suitable height, is usable without limiting to the above-mentioned materials.

As the magnetic layer 3, alloy containing Co as a principal constituent is applicable. As a film forming method thereof, there may be cited vacuum thin film forming techniques such as vacuum evaporation method, sputtering method, and ion plating method.

Hereat, assuming that the protective layer 4 is formed by a carbon film. The protective layer 4 can be formed with use of a PVD apparatus such as a sputtering apparatus, as well as a CVD apparatus utilizing the reaction of gas. As a material of the protective layer 4, besides carbon, any material that is usually used in a magnetic recording medium of metal magnetic thin-film type can be used. For example, there may be cited a monolayer film, multilayer film, and a composite film, which are obtained by forming $CrO_2$, $Al_2O_3$, BN, Co oxide, MgO, $SiO_2$, $Si_3O_4$, SiNx, SiC, SiNx-$SiO_2$, $ZrO_2$, $TiO_2$, TiC, etc. by vacuum thin film forming means. The magnetic layer 3 and the protective layer 4 are controlled to a predetermined thickness by generally using a transmission electron microscope (TEM).

In the magnetic recording medium 10, it is capable of ensuring good runnability and appropriate cleaning force and also suppressing abrasiveness by controlling the particle size and the density of particles forming the surface projections on the non-magnetic support member 1, and controlling the film thickness of the magnetic layer 3 and the protective layer 4.

The formation of the surface projections on the non-magnetic support member 1 may be performed by using the particles 2, for example, in the following method. To the raw material (chip) of a non-magnetic support member, particles 2 having a particle diameter of 15 nm±5 nm are added to and dispersed to prepare a non-magnetic support member 1, thereby forming surface projections whose height, namely the sum of a projecting portion of the particle and the thickness of a resin coat film covering the projecting portion, corresponds to the particle diameter.

If a metal magnetic thin film is formed on the non-magnetic support member 1 having the projections, the shape of the projections can be reflected onto the surface of the metal magnetic thin film. The accuracy at which the shape of the projections of the non-magnetic support member 1 is reflected onto the surface of the magnetic layer 3 depends on the film thickness of a metal magnetic thin film. In the cases where the metal magnetic thin film has a small film thickness, the shape of the projections of the non-magnetic support member is reflected onto the surface at a relatively high accuracy.

In an alternative, surface projections may previously be formed on a non-magnetic support member. In this case, a non-magnetic support member with a flat surface is used, and predetermined particles are disposed at a predetermined density on the magnetic layer 3, and then covered with the protective layer 4, thereby forming micro projections.

As a technique of measuring the height of the surface projections, there may be cited a method of observing the atom image on the surface of a magnetic recording medium through an atomic force microscope (AFM). The atomic force microscope has a plate-spring-like cantilever portion with a probe, the tip of which has a small radius of curvature, and a measuring system for measuring the displacement of the cantilever. The atomic force microscope detects the displacement of the cantilever that varies according to a repulsive force exerted between the atoms of the tip of the probe and the atoms of a sample to be measured.

In the atomic force microscope, the cantilever is irradiated by laser beams, and the position of the reflected ray is sensed, thereby measuring the displacement of the cantilever. In order to maintain the displacement of the cantilever constant, while moving vertically the Z-axis {the axis in a vertical direction with respect to a stage (so-called piezo-translator)} of the stage on which a sample to be measured is placed, the stage is scanned in the directions of the X-axis and the Y-axis (the two axes orthogonal to each other in a horizontal direction with respect to the stage), thereby obtaining a three-dimensional image based on the signals for controlling the X-axis, the Y-axis and the Z-axis.

In the magnetic recording medium 10, as required, an undercoating film may be provided on the non-magnetic support member, and a back coat layer, a top coat layer or the like may be formed. In this case, the undercoating film, the back coat layer and the top coat layer may be formed by any of the methods which are usually applied to this type of magnetic recording media.

Figure 2:
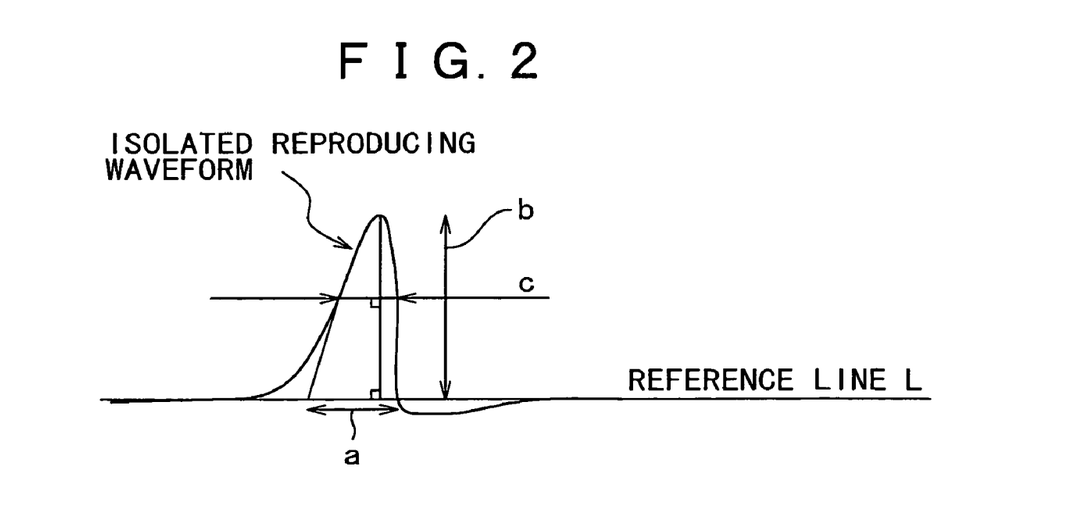
FIG. 2 is a conceptual diagram of an isolated reproducing waveform.

FIG. 2 shows a schematic diagram of an isolated reproducing waveform in the magnetic recording medium 10. In the present invention, the wave width at an intermediate position of a perpendicular extending from the maximum amplitude point of an isolated reproducing wave to a reference line "L" (i.e., an intermediate position of an amplitude "b" of the isolated reproducing wave), that is, a half-width "c" of an isolated reproducing waveform (hereinafter referred to simply as a half-width) should be selected less than the shortest recording wavelength used in a magnetic recording system.

Figure 3:
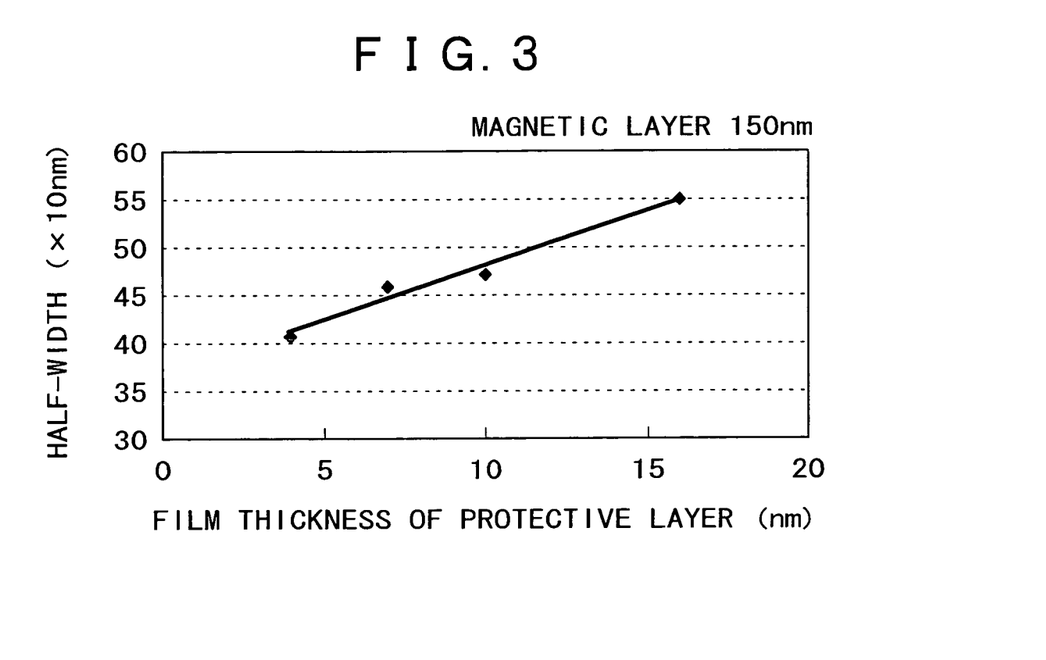
FIG. 3 shows a relationship between the film thickness of a protective layer and half-width.

FIG. 3 shows a relationship between the film thickness of the protective layer 4 composed of a carbon film and the half-width "c" shown in FIG. 2. In this example, the film thickness of the magnetic layer 3 was fixed at 150 nm, and the film thickness of the protective layer 4 was changed, thereby preparing a plurality of sample magnetic recording media. Then the measurements were made of their respective half-widths. As shown in FIG. 3, half-width increases as the film thickness of the protective layer 4 increases. It has been found that the half-width is 45 nsec when the protective layer 4 is 8 nm in film thickness, and 50 nsec when it is 12 nm.

Figure 4:
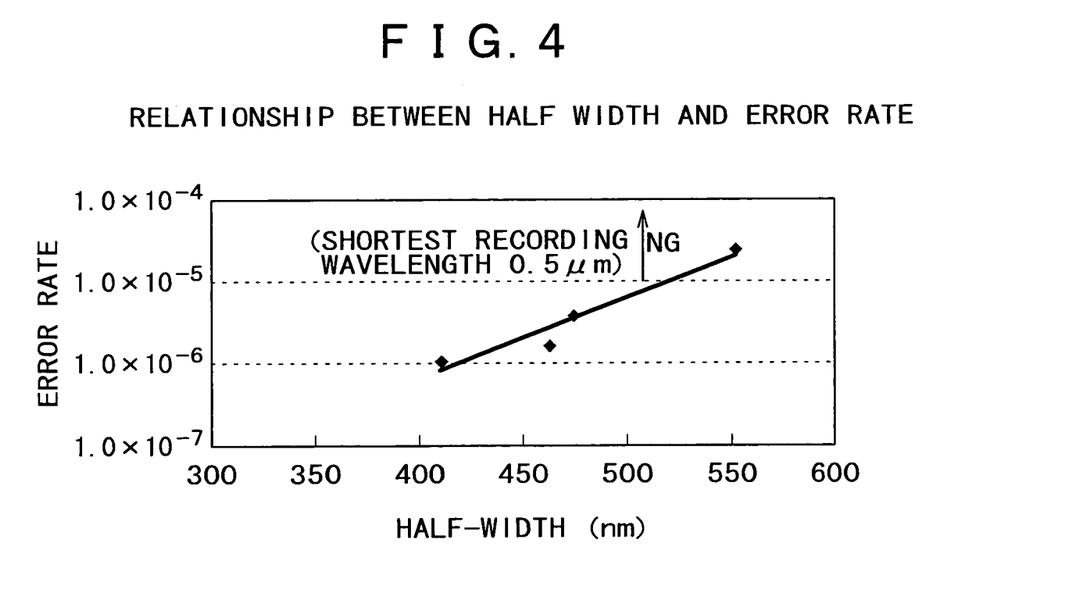
FIG. 4 shows a relationship between half-width and error rate.

The error rates of the sample magnetic recording media, which were prepared by adjusting the film thickness of the protective layer 4 and controlling half-width, were measured with use of a system of a DV format whose shortest recording wavelength used in a magnetic system is 0.5 µm. FIG. 4 shows the measurements results. Note that error rate should be practically $1 \times 10^{-5}$ or less. From FIG. 4, it has been found to be necessary to control half-width to not more than the shortest recording wavelength used in a magnetic system, namely 0.5 µm, in order to reduce error rate to $1 \times 10^{-5}$ or less.

Figure 5:
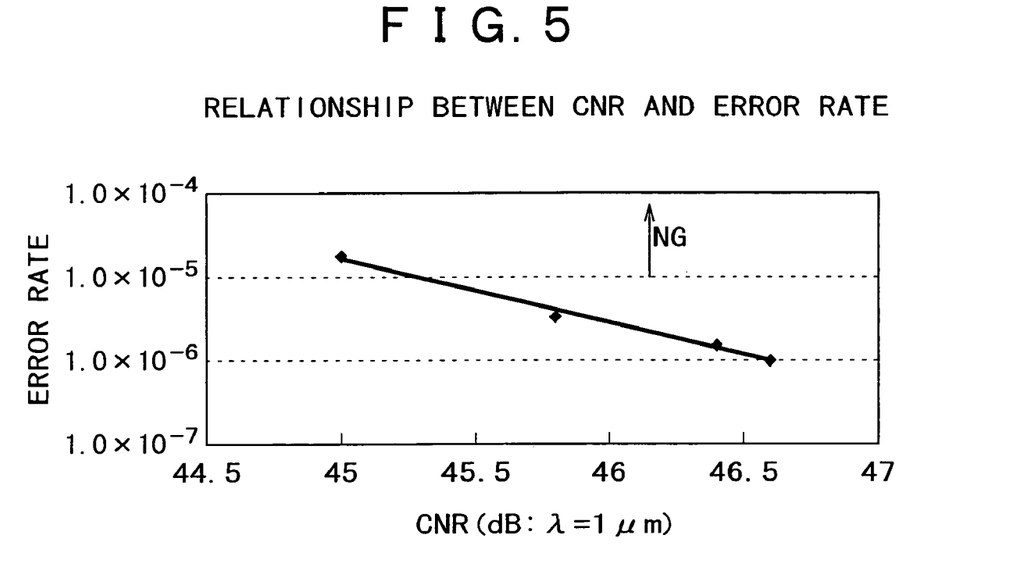
FIG. 5 shows a relationship between CNR and error rate.

As the film thickness of the protective layer 4 is increased, the output is lowered, so that CNR (total) is also lowered. FIG. 5 shows a relationship between CNR and error rate. Referring to FIG. 5, as CNR is smaller, error rate is worsened.

Although it is difficult to come to the conclusion whether error rate is due to half-width or CNR, only from the data shown in FIGS. 4 and 5, either of the two suggests a relevancy, as described previously. As to which of CNR and half-width predominantly causes error rate will be described hereinafter.

Figure 6:
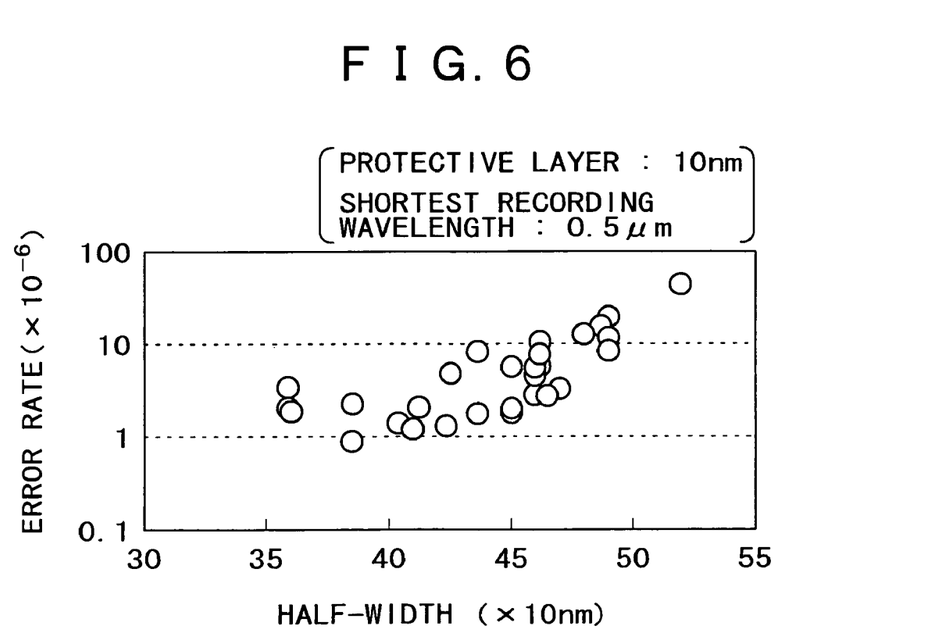
FIG. 6 shows a relationship between half-width and error rate.
Figure 7:
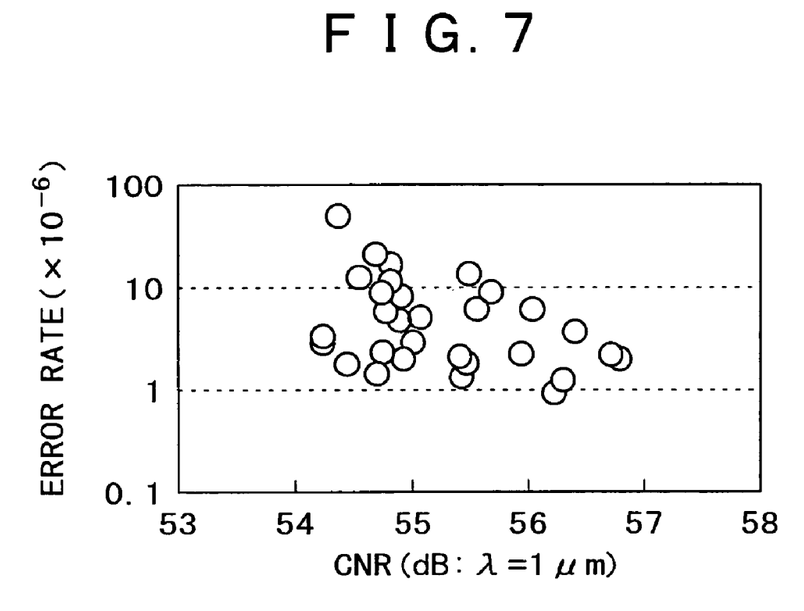
FIG. 7 shows a relationship between CNR and error rate.

Next, using a system of a DV format whose shortest recording wavelength used in a magnetic system was 0.5 µm, the film thickness of the protective layer 4 of a magnetic recording medium was fixed at 10 nm, and the film thickness of the magnetic layer 3 was changed. Likewise, the relationship between half-width and CNR (total) or error rate was examined. FIGS. 6 and 7 show the measurements results.

From FIG. 6, it has been found to be necessary to select half-width of 500 nm or less, that is, the shortest recording wavelength used in a magnetic system, in order to reduce error rate to $1 \times 10^{-5}$ or less. Accordingly, the relevancy between half-width and error rate can be recognized. On the other hand, as shown in FIG. 7, the values of CNRs for controlling error rate to $1 \times 10^{-5}$ or less fluctuate in the range of 54 to 57 dB. Accordingly, no relevancy between the two can be recognized. Specifically, in the cases where the output is lowered by reducing the film thickness of the magnetic layer 3 to 120 nm or less, or when noise is extremely large by increasing the film thickness of the magnetic layer 3 to 240 nm or more, the relevancy between CNR and error rate can be recognized. However, it has been found that the relevancy between CNR and error rate is not always recognized in an intermediate range. From the foregoing, it has been confirmed that in the range of CNRs at a certain level or above, half-width becomes more predominant on error rate than CNR.

Figure 8:
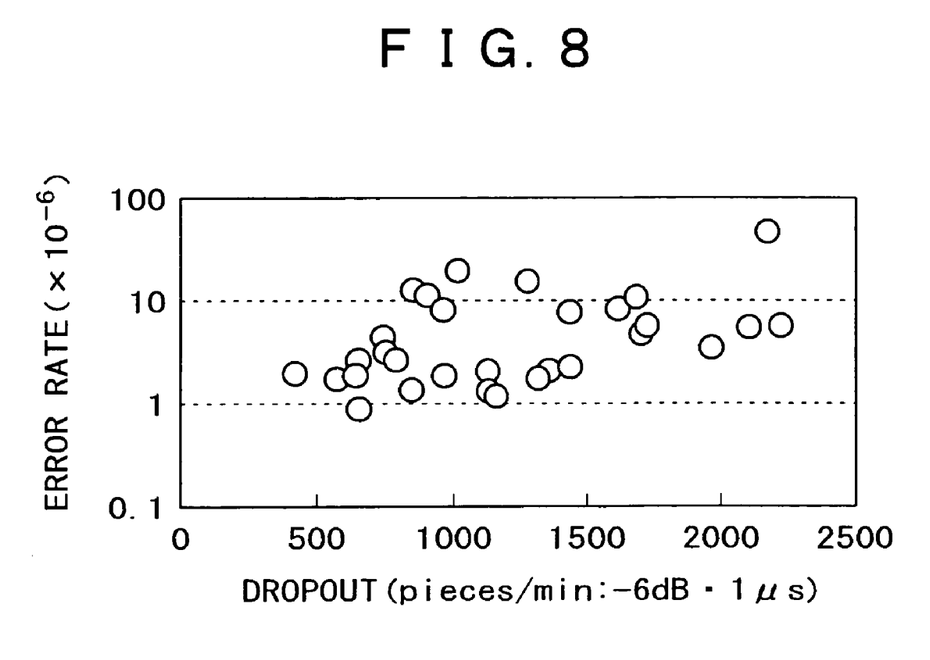
FIG. 8 shows a relationship between dropout and error rate.

Subsequently, dropout (D.O.) was measured, and the relationship with error rate was examined. FIG. 8 shows the measurements results. As shown in FIG. 8, no relevancy between D.O. and error rate can be recognized in a comparison range. However, it is obvious that D.O. can contribute to error rate. Therefore in order to confirm the degree of contribution, the relationship between D.O. and error rate was examined with regard to the samples whose half-width is not considered to exert any influence on error rate if half-width is selected from the range of 38 ns to 42 ns, taking FIG. 6 into consideration. As the result, it has been found that D.O. having a size of 6 dB-1 µs affects error rate. However, it has been confirmed that unless D.O. is 3000 pieces/min or more, it does not reach such a level of introducing a practical problem; and that half-width is the most predominant factor on error rate if used under D.O. of 3000 pieces/min or less.

As stated above, it has been proved that the factor of determining error rate is half-width when it is capable of achieving a CNR of 54 dB or more and a D.O. of 3000 pieces/min or less.

In order to achieve the conditions that CNR is 54 dB or more and D.O. is 3000 pieces/minor less, the film thickness of the magnetic layer 3 and that of the protective layer 4 are important parameters. Means for achieving these will be described concretely.

Controlling the film thickness of the magnetic layer 3 and the protective layer 4 leads to the control of spacing factor and magnetic characteristic (Br·δ/Hc) in the actual media. From the result shown in FIG. 3, it seems that spacing factor exerts the influence of 0.8 nsec per 1 nm in the film thickness of the protective layer 4.

On the other hand, from the examinations results of the characteristics of the samples applied in FIG. 4, it has been found that Br·δ/Hc has a relevancy; and that one capable of obtaining the characteristic of FIG. 4 by changing the film thickness of the magnetic layer 3 corresponds to the result after consideration of Br·δ/Hc and a surface oxide layer.

Figure 9:
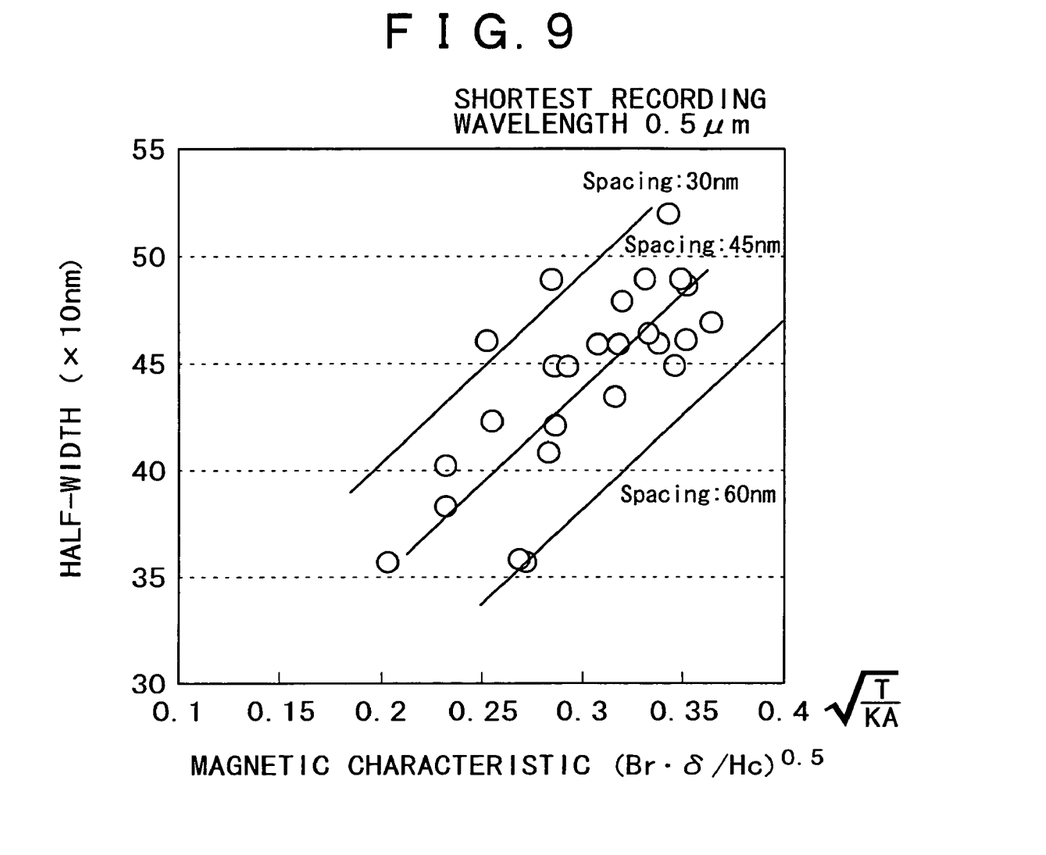
FIG. 9 shows a relationship between magnetic characteristic and half-width.

Subsequently, sample magnetic tapes having different film thickness of the magnetic layer 3 and different magnetic characteristics were prepared by controlling the amount of oxygen introduced during evaporation and the minimum incidence angle during evaporation in the formation of a magnetic layer. With respect to the samples having such a characteristic as shown in FIG. 4, the influence corresponding to spacing due to a surface oxide layer was corrected, and the relationship between magnetic characteristic and half-width was examined. FIG. 9 shows the measurements results.

Reference to FIG. 9 shows that the half-width of a magnetic recording medium is determined by spacing factor and magnetic characteristic $(Br·δ/Hc)^{0.5}$. It has been found from the results of FIG. 9 that in order to select half-width less than the shortest magnetic recording wavelength, 0.5 µm, it is suitable to prepare a magnetic recording medium having a spacing factor (SRz+the film thickness of the protective layer 4)≦35 nm, and having a magnetic energy of $(Br·δ/Hc)^{0.5}$≦0.35. Further, from the results of FIG. 9, it has been found to be suitable for selecting half-width less than the shortest magnetic recording wavelength, 0.5 µm, even when spacing factor is ≦38 nm and $(Br·δ/Hc)^{0.5}$≦0.30.

With regard to the magnetic recording media having the characteristic indicated by the symbols "○" (circle) in FIG. 9, their respective relationships between error rate and half-width were examined, thereby obtaining the result similar to the data shown in FIG. 5. From the foregoing, it can be confirmed that if output, CNR and D.O. are limited to a practically suitable range of criterion, the parameter predominantly affecting on error rate is half-width.

In order to further reduce error rate to a tolerance level, it has been found to be necessary to reduce half-width to not more than the shortest recording wavelength in a DVC format. The possible reason for this is that a signal processing method in a PR-4 recording as an example of recording types is related, so that the frequency used for D(1-D) processing corresponds to fn/2.

A similar verification of a MicroMV format using a PR-4 was also conducted and, as the result, the correlation between error rate and half-width has been observed. This proves that error rate can be reduced sufficiently in practice by setting half-width to not more than the shortest recording wavelength.

Figure 10:
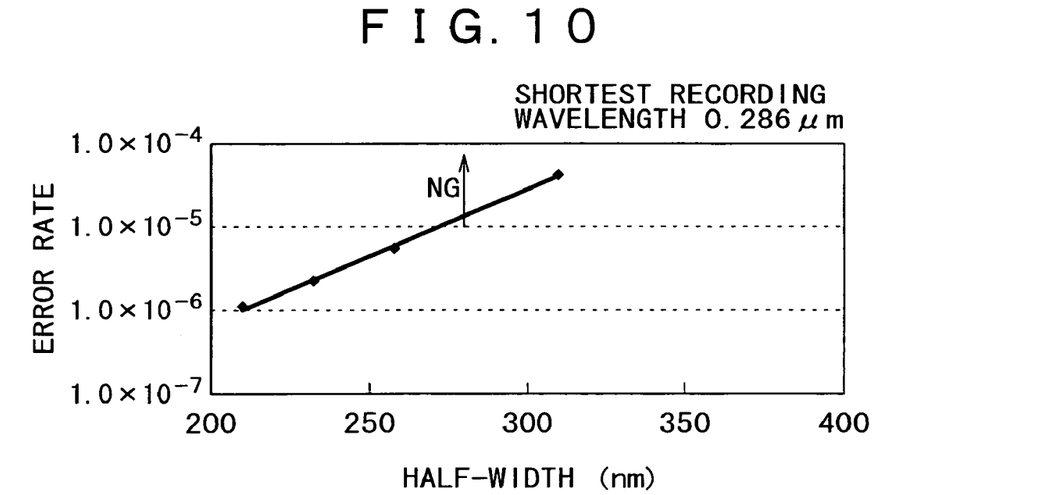
FIG. 10 shows a relationship between half-width and error rate.

With use of the above MicroMV format, it was verified whether a method of the present invention was valid for a system capable of using a GMR head. FIG. 10 shows a relationship between half-width and error rate when the shortest recording wavelength is 0.286 μm. Reference to FIG. 10 shows that half-width is required to be about 286 nm or less in order to reduce error rate sufficiently in practice. It has been found that regarding the GMR head, such a system as having a half-width of not more than the shortest recording wavelength is capable of satisfactorily reducing error rate. It has also been found that a similar effect is obtainable in a system using an inductive head.

Figure 11:
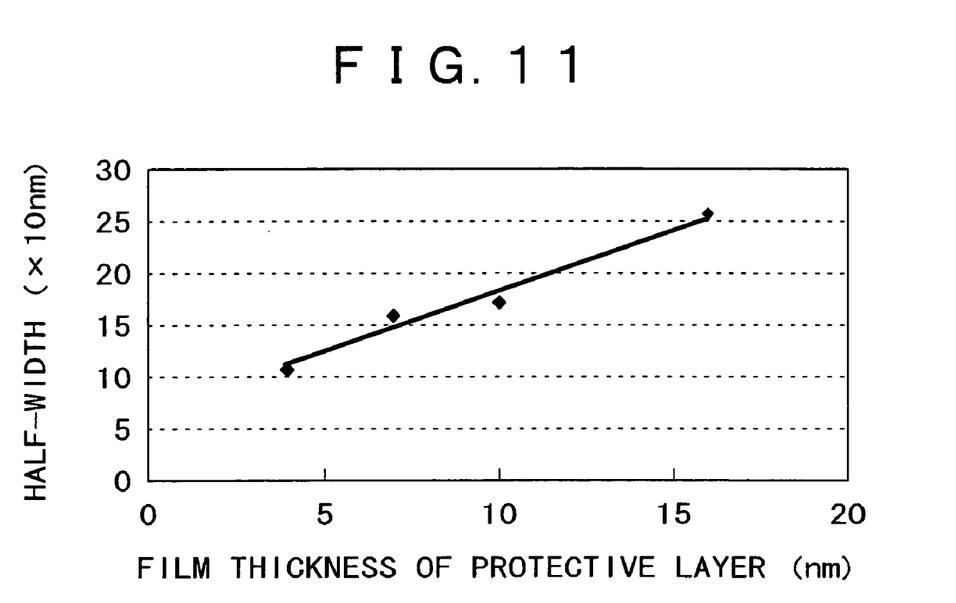
FIG. 11 shows a relationship between the film thickness of a protective layer and half-width.

The following is the case where the film thickness of the magnetic layer 3 is set to 50 nm in the magnetic recording medium 10 having the structure shown in FIG. 1. In this magnetic recording medium, the relationship between half-width and error rate was verified by controlling the film thickness of the protective layer 4. Reference to FIG. 11 shows that half-width increases as the film thickness of the protective layer 4 increases.

Figure 12:
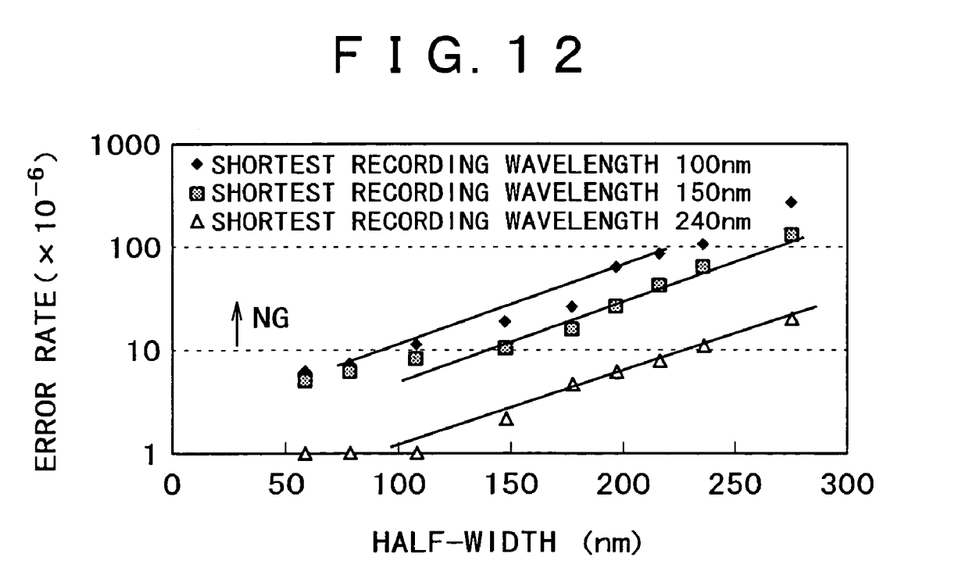
FIG. 12 shows a relationship between half-width and error rate.

A variety of samples, the half-width of each of which was controlled by changing the film thickness of the protective layer 4, were prepared and then applied to a magnetic recording system. The shortest recording wavelength was controlled to the range of 0.1 to 0.24 μm by changing the relative velocity of a magnetic recording medium and a magnetic head. Then, the relationship between the shortest recording wavelength and error rate was examined. FIG. 12 shows the measurements results. Reference to FIG. 12 shows that it is necessary to select a half-value less than the shortest recording wavelength used in a magnetic system, in order to reduce error rate to $1 \times 10^{-5}$ or less. That is, when the shortest recording wavelength is 0.1 μm, 0.15 μm, and 0.24 μm, it is necessary to select a half-width of 100 nm or less, 150 nm or less, and 240 or less, respectively.

Subsequently, CNR was controlled by fixing the film thickness of the protective layer 4 at 10 nm, and changing the film thickness of the magnetic layer 3. Then, the relationship between CNR and error rate was examined, and the same result as shown in FIG. 5 was obtained. This shows a relevancy between CNR and error rate.

Figure 13:
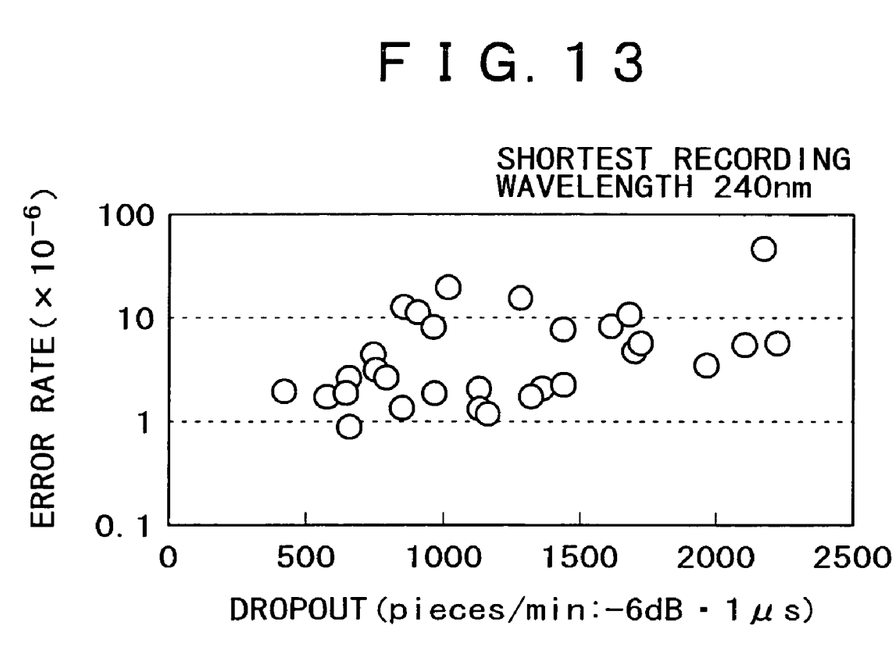
FIG. 13 shows a relationship between dropout and error rate.

Next, dropout (D.O.) was measured to examine the relationship with error rate. FIG. 13 shows the measurements results. Reference to FIG. 13 shows no relevancy between D.O. and error rate in a comparative range. However, it is obvious that D.O. can contribute to error rate. In order to confirm the degree of contribution, samples, the half-width of each of which is not considered to exert any influence on error rate, were prepared by setting the shortest recording wavelength to 0.24 μm, and half-width to the range of 120 to 200 nm. Then, the relationship between D.O. and error rate was examined. As the result, it has been found that D.O. having a size of 6 dB-1 μs affects error rate. However, it has been confirmed that unless D.O. is 3000 pieces/min or more, it does not reach such a level of introducing a practical problem; and that half-width is the most predominant factor on error rate if used under D.O. of 3000 pieces/min or less.

As apparent from the foregoing, error rate can be reduced effectively by selecting the isolated reproducing waveform half-width less than the shortest recording wavelength in the case of setting the shortest recording wavelength to 0.1 to 0.24 μm in a PR-4 recording used for digital magnetic recording, and in the case of a system using an inductive head, an MR head, or a GMR head.

EXAMPLES

The following are specific examples of the present invention. In the structure of the magnetic recording medium 10 shown in FIG. 1, modifications were made to control isolated reproducing waveform half-width, thereby preparing magnetic tapes of the following Sample 1 to Sample 5.

Sample 1

Surface Roughness of Non-magnetic Support Member Rz: 35 nm
Film Thickness of Magnetic Layer: 160 nm
Hc: 123 kA/m
$(Br \cdot \delta/Hc)^{0.5}$: 0.35
Film Thickness of Protective Layer: 10 nm
Half-width: 42 nsec Sample 2

Surface Roughness of Non-magnetic Support Member Rz: 35 nm
Film Thickness of Magnetic Layer: 160 nm
Hc: 123 kA/m
$(Br \cdot \delta/Hc)^{0.5}$: 0.35
Film Thickness of Protective Layer: 16 nm
Half-width: 55 nsec Sample 3

Surface Roughness of Non-magnetic Support Member Rz: 25 nm
Film Thickness of Magnetic Layer: 160 nm
Hc: 123 kA/m
$(Br \cdot \delta/Hc)^{0.5}$: 0.25
Film Thickness of Protective Layer: 10 nm
Half-width: 40 nsec Sample 4

Surface Roughness of Non-magnetic Support Member Rz: 15 nm
Film Thickness of Magnetic Layer: 150 nm
Hc: 105 kA/m
$(Br \cdot \delta/Hc)^{0.5}$: 0.25
Film Thickness of Protective Layer: 10 nm
Half-width: 30 nsec

Sample 5

Surface Roughness of Non-magnetic Support Member Rz: 15 nm
Film Thickness of Magnetic Layer: 180 nm
Hc: 100 kA/m
$(Br \cdot \delta/Hc)^{0.5}$: 0.35
Film Thickness of Protective Layer: 10 nm
Half-width: 48 nsec With use of a magnetic recording system of a DV format whose shortest recording wavelength is 0.5 µm, measurements were made of the error rates of the above-mentioned magnetic tapes in Samples 1 to 5. In the magnetic tapes of Sample 1 and Samples 3 to 5, their respective error rates were reduced to $1 \times 10^{-5}$ or less, thereby obtaining a good characteristic in practice. Whereas in the magnetic tape of Sample 2, the error rate exceeded $1 \times 10^{-5}$, thus failing to obtain a sufficient characteristic in practice.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A method of reducing an error rate of a magnetic recording medium including a magnetic layer composed of a metal magnetic thin film formed over a main surface of a non-magnetic support member, comprising the step of:
   selecting an isolated reproducing waveform half-width of a signal reproduced by a magnetic head to be less than a shortest recording wavelength used in a magnetic recording system, wherein:
   the magnetic recording medium has a spacing factor that satisfies the relationship SRz+film thickness of a protective layer is<or=35 nm.

2. The method of reducing an error rate of a magnetic recording medium according to claim 1, wherein:
   a shortest recording wavelength to be used is 0.1 µm to 0.24 µm.

3. The method of reducing an error rate of a magnetic recording medium according to claim 1, wherein:
   a magnetoresistance effect type magnetic head or a giant magnetoresistance effect type magnetic head is applied as said magnetic head for reproduction.

4. The method of reducing an error rate of a magnetic recording medium according to claim 1, wherein:
   the magnetic layer is formed by oblique evaporation of Co.

* * * * *